A. W. HALL, OF NEW YORK, N. Y.

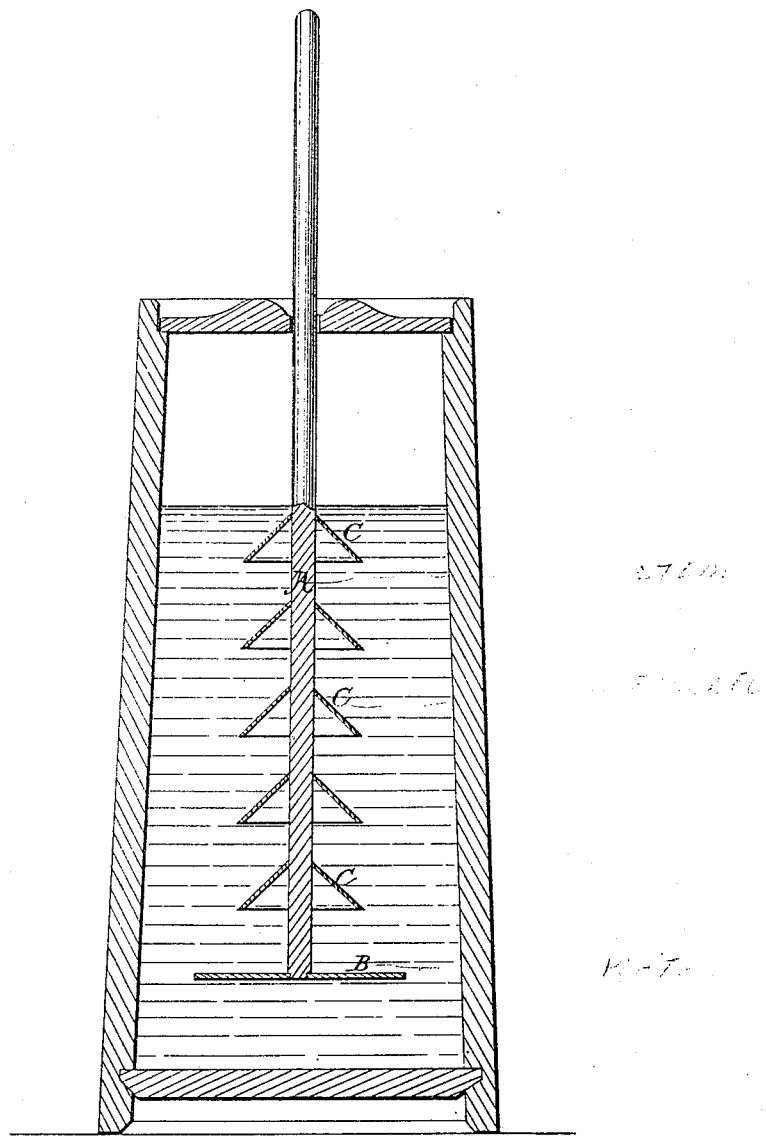

IMPROVEMENT IN CHURN-DASHERS.

Specification forming part of Letters Patent No. 60,363, dated December 11, 1866.

*To all whom it may concern:*

Be it known that I, A. W. HALL, of the city, county, and State of New York, have invented a certain new and useful Improvement on Atmospheric Churn-Dashers, of which the following is a full, clear, and exact description, reference being had to the accompanying drawing, forming part of this specification, and which represents a vertical section of a churn-dasher constructed according to my improvement, and as arranged for action within an ordinary churn-tub.

The introduction and agitation of air within the body of milk in a churn is no new theory or principle of action, and its advantages, not only in expediting the process of churning, but also in adding, it is believed, to the quantity of butter produced from a given quantity of milk, are well understood. Various modes have been adopted for carrying out this principle of action, and, among others, the dasher has been constructed in sundry different ways to accomplish the same; but many or most of such previous attempts have been defective or otherwise objectionable.

It is to the atmospheric churn-dasher that my improvement relates; and the nature of my invention consists in providing the dasher-stem with a succession of inverted funnels or hollow cones arranged one above the other and attached air-tight to the stem, and which not only serve, in conjunction with the dasher beneath, to agitate the milk, but also to catch, or carry down and keep in circulation and agitation in the milk, atmospheric air.

The following description, with reference to the accompanying drawing, will further explain this my invention.

A is the dasher-stem, and B an ordinary flat dasher at foot, though any other suitable form may be used. The same is arranged for vertical action, in the usual way, within a churn-tub.

Attached to the dasher-stem, and arranged one above the other, are a succession of inverted funnels or hollow cones, C, which may be made of tin, zinc, or any other suitable material. These funnels, of which there may be any desired number, may either be of the same or different sizes, but should be smaller than the dasher. They may be situated at equal or unequal distances apart. They not only serve, in conjunction with the dasher, to agitate the milk, by direct contact, but act as cups to catch and carry down atmospheric air into the milk and to circulate and agitate it in the latter, said inverted funnels successively acting, each downstroke, to depress any air that may attempt to rise in the line of or around the stem, and rendering unnecessary, for the purpose of introducing air, the rise of the dasher at intervals out of the milk. The conical exterior of these funnels in no way favors the lift or escape of air back in the upstroke of the dasher, but materially assists, by throwing the milk out against or toward the sides of the tub, in expediting and improving the churning process. An atmospheric churn-dasher thus constructed, therefore, has not only efficiency but great simplicity to recommend it.

Having thus described my invention, I do not claim the inverted funnels, *per se;* but

What I claim herein as new and useful, and desire to secure by Letters Patent, is—

An atmospheric churn-dasher constructed with a series of inverted funnels or hollow cones, arranged one above the other, and attached firmly and air-tight to the stem of the common dasher, in combination with the plate B at bottom of the stem, substantially as shown and described.

A. W. HALL.

Witnesses:
GEO. D. McKINNEY,
JOHN ANTHONEY.